United States Patent
Jäntsch et al.

(10) Patent No.: US 12,252,154 B2
(45) Date of Patent: Mar. 18, 2025

(54) AUTOMATED SYSTEM INCLUDING REACHABILITY ANALYSIS

(71) Applicant: Siemens Aktiengesellschaft, Munich (DE)

(72) Inventors: Michael Jäntsch, Princeton, NJ (US); Nareshkumar Nandola, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 904 days.

(21) Appl. No.: 17/294,549

(22) PCT Filed: Dec. 13, 2018

(86) PCT No.: PCT/US2018/065327
§ 371 (c)(1),
(2) Date: May 17, 2021

(87) PCT Pub. No.: WO2020/122910
PCT Pub. Date: Jun. 18, 2020

(65) Prior Publication Data
US 2021/0403041 A1    Dec. 30, 2021

(51) Int. Cl.
*B60W 60/00* (2020.01)
*B60W 10/04* (2006.01)
(Continued)

(52) U.S. Cl.
CPC ........ *B60W 60/0015* (2020.02); *B60W 10/04* (2013.01); *B60W 10/18* (2013.01);
(Continued)

(58) Field of Classification Search
CPC .. B60W 60/0015; B60W 10/04; B60W 10/18; B60W 2710/18; B60W 2720/10;
(Continued)

(56) References Cited

U.S. PATENT DOCUMENTS

| | | | |
|---|---|---|---|
| 4,344,498 | A | 8/1982 | Lindfors |
| 7,735,126 | B2 | 6/2010 | Zhang et al. |

(Continued)

FOREIGN PATENT DOCUMENTS

| | | |
|---|---|---|
| CN | 1350664 A | 5/2002 |
| CN | 103578211 A | 2/2014 |

(Continued)

OTHER PUBLICATIONS

Kai Cao et al.; "Reachable Set Modeling Approach for Autonomous Vehicle's Dynamic Conflict Control"; School of Traffic & Vehicle Engineering, Shandong University of Technology, Zibo 255049, China; vol. 29; No. 8; Aug. 2017; DOI: 10.16182/j.issn1004731x.joss.201708004 ; pp. 1658-1666.

(Continued)

*Primary Examiner* — Aryan E Weisenfeld

(57) ABSTRACT

An autonomous system includes a vehicle operable to travel from a first point to a second point, a first actuator operable to adjust a speed of the vehicle, and a second actuator operable to adjust a direction of travel of the vehicle. A controller is operable to send control signals to the first actuator and the second actuator to facilitate the transition of the system from a first state to a second state during travel between the first point and the second point. A reachability controller is coupled to the controller to receive the first state and the control signals and to analyze the first state and the control signals to determine if the second state is a safe state.

11 Claims, 3 Drawing Sheets

(51) Int. Cl.
*B60W 10/18* (2012.01)
*G05B 13/02* (2006.01)
*G05D 1/00* (2006.01)
*H02J 3/38* (2006.01)

(52) U.S. Cl.
CPC ......... *G05B 13/027* (2013.01); *G05D 1/0055* (2013.01); *G05D 1/0088* (2013.01); *G05D 1/106* (2019.05); *H02J 3/381* (2013.01); *B60W 2710/18* (2013.01); *B60W 2720/10* (2013.01); *B60W 2720/12* (2013.01); *B60W 2720/24* (2013.01); *H02J 2203/20* (2020.01)

(58) Field of Classification Search
CPC ......... B60W 2720/12; B60W 2720/00; B60W 2720/24; G05D 1/106; G05D 1/0055; G05D 1/0088; G05B 13/027; H02J 3/381; H02J 2203/20
See application file for complete search history.

(56) References Cited

U.S. PATENT DOCUMENTS

| | | | |
|---|---|---|---|
| 9,619,611 | B2 | 4/2017 | Giguere et al. |
| 9,676,464 | B2 | 6/2017 | Johnson et al. |
| 9,684,306 | B2 | 6/2017 | Sprigg |
| 10,002,471 | B2 | 6/2018 | Blayvas et al. |
| 10,065,680 | B2 | 9/2018 | Yu et al. |
| 10,976,178 | B2 | 4/2021 | Piemonte et al. |
| 2003/0023328 | A1 | 1/2003 | Yasui |
| 2009/0099710 | A1 | 4/2009 | Takach, Jr. |
| 2010/0017049 | A1 | 1/2010 | Swearingen et al. |
| 2011/0238254 | A1 | 9/2011 | Abbink et al. |
| 2017/0008562 | A1 | 1/2017 | Shashua et al. |
| 2018/0009445 | A1 | 1/2018 | Nishi |
| 2018/0032082 | A1* | 2/2018 | Shalev-Shwartz ................ G01C 21/3453 |
| 2018/0188727 | A1 | 7/2018 | Zhuang et al. |
| 2018/0247160 | A1* | 8/2018 | Rohani ................ G05D 1/0221 |
| 2018/0292222 | A1* | 10/2018 | Lin ..................... G05D 1/0088 |

FOREIGN PATENT DOCUMENTS

| | | |
|---|---|---|
| CN | 105122166 A | 12/2015 |
| CN | 106066644 A | 11/2016 |
| CN | 107036600 A | 8/2017 |
| CN | 107077797 A | 8/2017 |
| CN | 107111316 A | 8/2017 |
| CN | 107226088 A | 10/2017 |
| CN | 108351221 A | 7/2018 |
| JP | H06255517 A | 9/1994 |

OTHER PUBLICATIONS

PCT International Search Report and Written Opinion of International Searching Authority mailed Dec. 20, 2019 corresponding to PCT International Application No. PCT/US2018/065327 filed Dec. 13, 2018.

* cited by examiner

AUTOMATED SYSTEM INCLUDING REACHABILITY ANALYSIS

TECHNICAL FIELD

The present disclosure is directed, in general, to a system and method for assuring proper performance of an autonomous system, and more specifically to a system and method that assures proper operation while reducing the amount of testing required.

BACKGROUND

As autonomous systems become ever more present in industrial environments, it becomes more difficult to assure correct operation. Current systems are certified by analyzing all possible states. However, such an approach becomes infeasible as the systems and the environments they operate in become more complex and unpredictable.

SUMMARY

An autonomous system includes a vehicle operable to travel from a first point to a second point, a first actuator operable to adjust a speed of the vehicle, and a second actuator operable to adjust a direction of travel of the vehicle. A controller is operable to send control signals to the first actuator and the second actuator to facilitate the transition of the system from a first state to a second state during travel between the first point and the second point. A reachability controller is coupled to the controller to receive the first state and the control signals and to analyze the first state and the control signals to determine if the second state is a safe state.

In another construction, a method of operating an autonomous system includes providing a vehicle operable to travel from a first point to a second point, positioning a first actuator in a first position, the first actuator controlling the speed of the vehicle, and positioning a second actuator in a second position, the second actuator controlling a direction of travel of the vehicle, the first position and the second position defining a first state of the system. The method also includes sending a control signal to one of the first actuator and the second actuator to change the state of the system, analyzing the first state and the control signal to determine a second state which would result when the control signals are implemented, blocking the control signals in response to the analysis showing that the second state is not a safe state, and blocking the control signals in response to the analysis showing that a safe state cannot be reached from the second state.

In another construction, an autonomous system includes a first actuator operable to adjust a first attribute of the system, a second actuator operable to adjust a second attribute of the system, and a controller operable to send control signals to the first actuator and the second actuator to facilitate the movement of the system from a first state to a second state during the performance of a task by the system. A reachability controller is coupled to the controller to receive the first state and the control signals and to analyze the first state and the control signals to determine if the system can reach a safe state from the resulting second state.

In another construction, an autonomous system includes a grid arranged to distribute electrical power to a plurality of power consumers, a plurality of distributed power generation units, each unit individually controllable and operable to deliver a quantity of power to the grid, and a plurality of switches arranged to control the flow of electrical power between the power generation units and the power consumers. A controller includes a neural network model of the grid, the plurality of distributed power generation units, and the plurality of switches and is operable to provide control signals to each unit of the plurality of distributed power generation units and each switch of the plurality of switches to transition the system from a first state. A reachability controller is coupled to the controller to receive the first state and the control signals and to analyze the first state and the control signals to determine a second state which will result if the control signals are implemented and to determine if the second state is a safe state.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
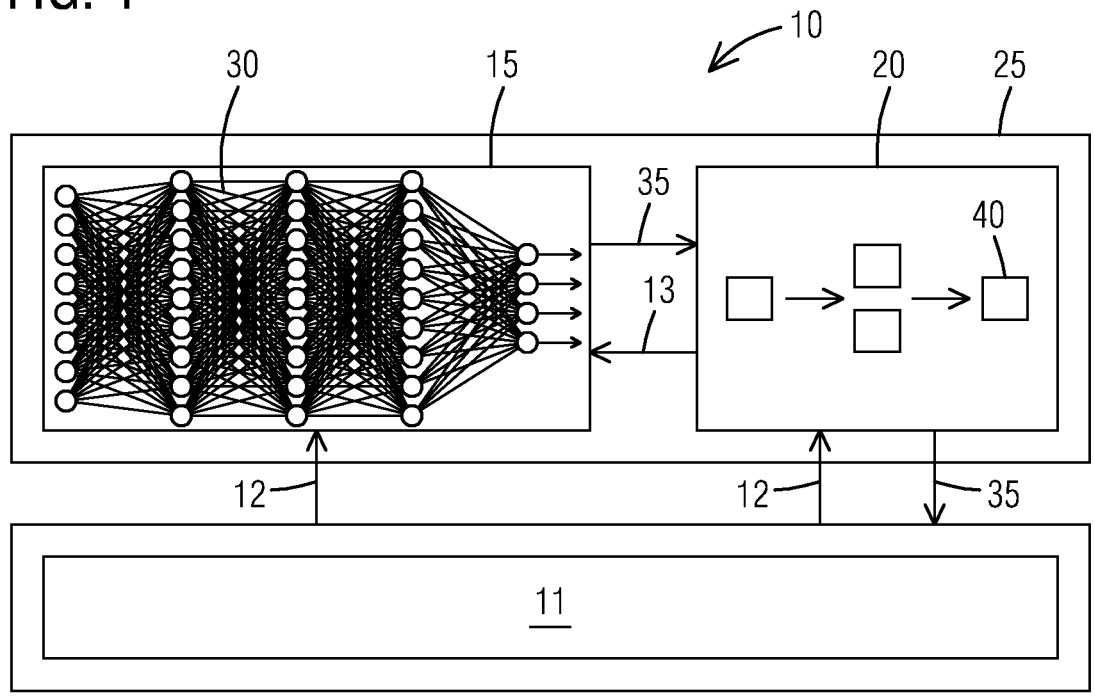
FIG. 1 is a schematic illustration of an autonomous system including a controller and a reachability controller.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

FIG. 1 schematically illustrates an autonomous system 10 that includes a physical device 11 that is controlled by a controller 15 and a reachability controller 20. The controller 15 and the reachability controller 20 are each software-based controllers that are run by one or more computers 25. While not illustrated herein, any autonomous system 10 would include one or more sensors that are connected to one or both of the controller 15 and the reachability controller 20 to sense various aspects of the environment. For example, optical sensors may be positioned to provide visual images of the environment. Another system may include a LIDAR system that detects the distance and direction to outside objects around the system 10. Still other sensors could include RFID readers, bar code readers, infrared sensors, RADAR sensors, acoustic sensors, autonomic sensors, and the like.

As is well understood, the software aspects of the present invention could be stored on virtually any computer readable medium including a local disk drive system, a remote server, internet, or cloud-based storage location. In addition, aspects could be stored on portable devices or memory devices as may be required. The computer 25, or computers generally includes an input/output device that allows for access to the software regardless of where it is stored, one or more processors, memory devices, user input devices, and output devices such as monitors, printers, and the like.

The processor, or processors could include a standard micro-processor or could include artificial intelligence accelerators or processors that are specifically designed to perform artificial intelligence applications such as artificial neural networks, machine vision, and machine learning. Typical applications include algorithms for robotics, internet of things, and other data-intensive or sensor-driven tasks. Often AI accelerators are multi-core designs and generally focus on low-precision arithmetic, novel dataflow architectures, or in-memory computing capability. In still other applications, the processor may include a graphics processing unit (GPU) designed for the manipulation of images and the calculation of local image properties. The mathematical basis of neural networks and image manipulation are similar, leading GPUs to become increasingly used for machine learning tasks. Of course, other processors or arrangements could be employed if desired. Other options include but are not limited to field-programmable gate arrays (FPGA), application-specific integrated circuits (ASIC), and the like.

The computer 25 may also include communication devices that would allow for communication between other computers or computer networks, as well as for communication with other devices such as machine tools, work stations, actuators, controllers, sensors, and the like.

Returning to FIG. 1, the controller 15 preferably includes a neural network model 30 of the physical device 11 and the expected environment in which the physical device 11 will operate. As one of ordinary skill will understand, neural network models are very complicated programs that are challenging to test under all operating conditions. For example, an autonomous vehicle such as an automobile may be relatively simple to model. However, the environment in which the automobile operates is extremely dynamic making it very difficult to test all possible operating conditions. Any one operating condition or state can lead to virtually infinite other states, and those states lead to infinitely more options, rapidly leading to a very complicated model to analyze and test.

During operation of the system 10, it is desirable to maintain the physical device 11 in a stable or safe state, or to adjust the physical device 11 as may be required to complete a goal. For example, a user may provide inputs to the physical device 11. These inputs are converted to signals 12 that are transmitted to the controller 15 and can be transmitted to the reachability controller 20. The controller 15 generates control signals 35 that are sent to various components in the physical device 11 to transition the physical device 11 between states as the controller 15 deems necessary to achieve the goals of the physical device 11. This operation will be described in greater detail with regard to the examples of FIGS. 4-6.

The reachability controller 20 is positioned between the controller 15 and the physical device 11 to analyze the control signals 35 and the potential changes being made to the physical device 11 to assure that those changes result in the physical device 11 moving into an acceptable state. In preferred constructions, the reachability controller 20 includes an analytical model 40 of the physical device 11 and the environment. The analytical model 40 includes a dynamical model of the physical device 11 that is far simpler than the neural network model 30 of the physical device 11. The simplicity of the analytical model 40 allows for the rapid calculation of states of the model to determine if those states are acceptable or unacceptable, but more importantly allows for the complete testing of all operating conditions. The reachability controller 20 will receive data indicative of the current state of the physical device 11 and the control signals 35 and operates to determine the likely new state of the physical device 11 from that data. The reachability controller 20 then analyzes that second state to determine if the physical device 11 should be allowed to transition to that state. If the analysis concludes that the transition should occur, the signals 35 are passed to the physical system 11 as control signals 35a. In some cases, the signals 35a passed to the physical system are modified slightly by the reachability controller 20 to assure that a safe state is reached, in other cases, the signals 35 are passed to the physical system as signals 35a with no changes. If the analysis concludes that the transition should not occur, some systems pass a feedback signal 13 from the reachability controller 20 to the controller 15 to further "teach" the controller 15 and thereby improve future decision-making, Before proceeding further, the term "states" should be clarified. Any system is operable in one of many different states. The states may be represented by control device positions, outside parameters of the system, or any other distinguishing feature. For example, an autonomous automobile may have a first state in which it is moving forward at 20 km/hr in a straight line. If the automobile changes to 30 km/hr it has changed to a second state. Each state can be generically classified as one of two types of states. The first state type is referred to herein as known, acceptable, or safe with other terms also being possible. These states are typically states in which the autonomous system is operating in a stable manner and is not at risk of failing, becoming unstable, or causing harm to outside observers or equipment. The second state type is referred to herein as unknown, unacceptable, or unsafe with other terms also being possible. These states are typically states or conditions in which the system is unstable, is about to fail, places the system in an undesirable position, or could cause harm to outside observers and equipment.

Figure 3:
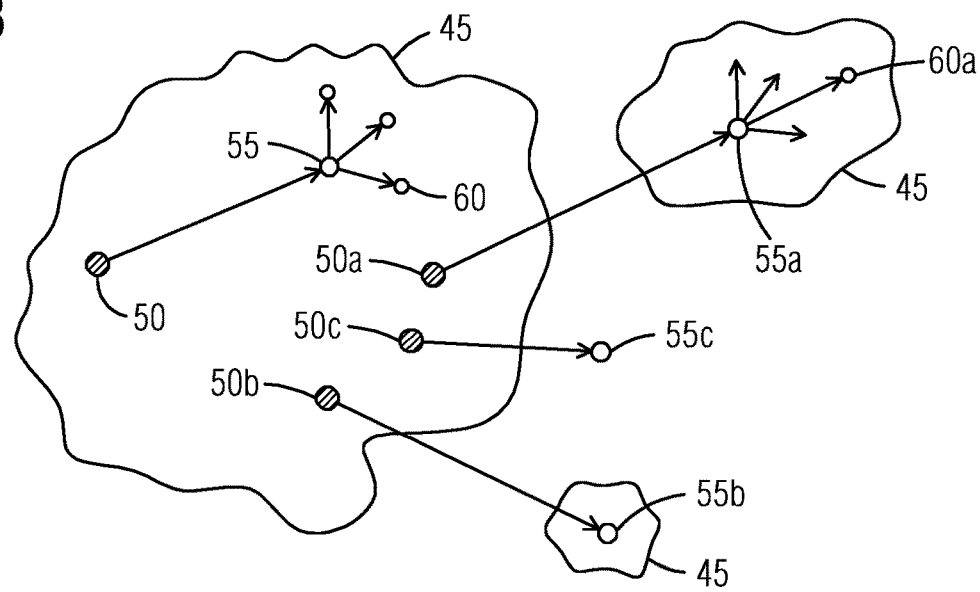
FIG. 3 is a schematic illustration of various states that are either safe states or unsafe states.

FIG. 3 schematically illustrates several examples of moving between states. In FIG. 3, the space within boundaries 45 represent the safe states, while states outside of the boundaries 45 are unsafe states. The space might represent the travel direction of the physical device 11 with the distance from the center of the space representing the speed of travel.

FIG. 3 schematically illustrates the physical device 11 in a first safe state 50. The controller 15 has generated control signals 35 to move the system 10 to a second state 55. The reachability controller 20 receives information indicative of the first state 50 and the control signals 35 being generated by the controller 15. The reachability controller 20 determines the likely second state 55 based on the input of those control signals 35 to determine where that second state 55 falls in the illustration of FIG. 3. The reachability controller 20 than makes two determinations. First, the reachability controller 20 determines if the second state 55 is a safe state. If it is not, the second determination does not need to be made and the control signals 35 are blocked to prevent transition of the physical device 11 to the second state 55. However, if the second state 55 is a safe state, the reachability controller 20 determines if additional safe states 60 can be reached from the second state 55. If additional safe states 60 are available, the control signals 35 pass to the physical device 11 and the physical device 11 transitions to the second state 55. However, if there are no additional safe states 60 to which the physical device 11 can transition from the second state 55, the reachability controller 20 will block the control signals 35 and the physical device 11 will not transition to the second state 55. Thus, in order for the transition to occur, both determinations must be positive. If either determination results in a negative answer, the control signals 35 are blocked and the physical device 11 remains in the first state 50.

In the first example of FIG. 3, the second state 55 is calculated as being a safe state. In addition, the reachability controller 20 further determines that there are multiple additional safe states 60 into which the physical device 11 could transition from the second state 55. In this situation, the reachability controller 20 will allow the control signals 35 to pass to the physical device 11 and the physical device 11 will transition to the second state 55.

In a second example, the control signals 35 are generated to transition from a first state 50a to a second state 55a. The second state 55a is calculated as being a safe state but one that is surrounded by fewer safe states 60a. In this case, the reachability controller 20 still finds that there are sufficient additional safe states 60a that can be reached from the second state 55a and the control signals 35 are allowed to pass to transition the physical device 11 to the second state 55a.

In a third example, control signals 35 are generated to transition from a first state 50b to a second state 55b. The reachability controller 20 determines that the likely second state 55b is a safe state. However, the second state 55b is surrounded by unsafe states and no additional safe states can be reached from this second state 55b. In this case, the reachability controller 20 will block the control signals 35 to prevent transition to the second state 55b.

In a fourth example, control signals 35 are generated to transition from a first state 50c to a second state 55c. The reachability controller 20 determines that the likely second state 55c is an unsafe state. In this case, the second determination is not made, and the reachability controller 20 blocks the control signals 35 to prevent transition to the second state 55c.

The ability to reach a safe state from a given state means different things in different examples and situations. The following specific examples better illustrate this, as well as the operation of the controller 15 and the reachability controller 20.

Figure 2:
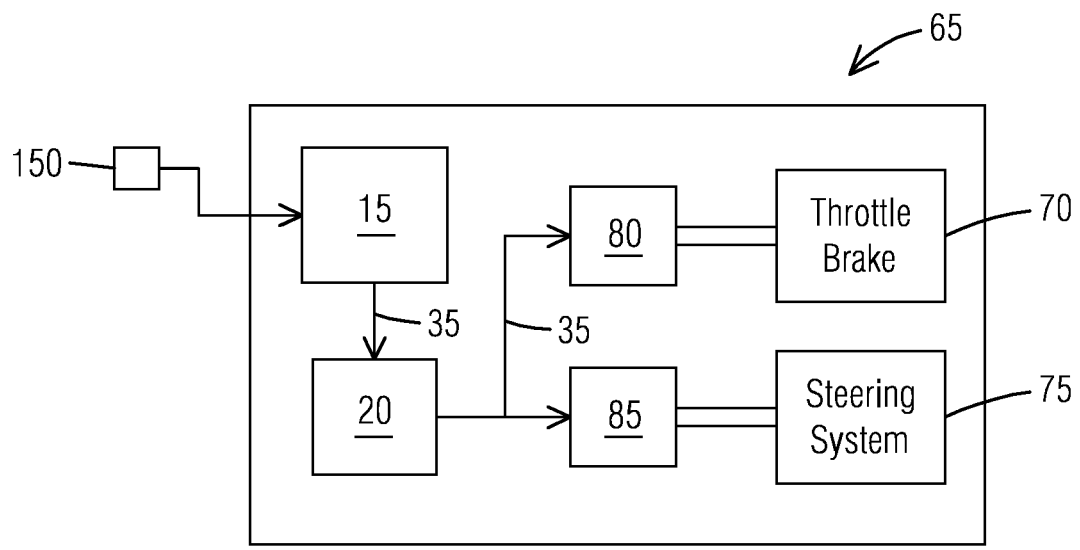
FIG. 2 is a schematic illustration of an autonomous vehicle including a controller and a reachability controller.

FIG. 2 illustrates an example of an autonomous system including a physical device 11 in the form of an autonomous vehicle 65. While the vehicle 65 will be discussed as an automobile, it could be any over the road vehicle or could be an aerial vehicle including fixed wing aircraft, rotary aircraft, or other craft. The vehicle includes a throttle and brake arrangement 70 that is moved to control the speed of the vehicle 65 and a steering mechanism 75 that can be adjusted to control the direction of travel of the vehicle 65. In the case of electrically-powered vehicles 65, the throttle may include a variable frequency drive or other mechanism that controls the power being delivered to the engines. A first actuator 80 is positioned to adjust the position of the throttle and brake arrangement 70 and a second actuator 85 is positioned to adjust the steering mechanism 75. Of course, additional actuators and devices can be employed and are generally employed in autonomous devices. For example, in one application, one actuator controls a throttle while a separate actuator controls the brakes. A user or other system may provide input data 150 to the controller 15. For example, a user may enter a new destination or set a new speed for the automobile 65. The controller 15 collects that information and determines if the current state of the automobile 65 needs to be adjusted. If an adjustment is required, control signals 35 are sent to the reachability controller 20 along with the current state of the automobile 65. The reachability controller 65 determines if the control signals 35 should be passed as discussed with regard to FIG. 3, and if they should be, passes them to the various actuators 80, 85 which then make the necessary adjustments.

In the case of the automobile 65, safe states may be states that maintain the position of the automobile 65 on the road, traveling below a given speed or speed limit, and safely spaced from other vehicles or objects. In one situation, the automobile 65 might be approaching a parked vehicle in its path. If the user attempts to accelerate, the controller 15 would generate the necessary control signals 35 and send them to the reachability controller 20. The reachability controller 20 will determine if the automobile 65 can still stop before hitting the parked vehicle, before passing the control signals 35 to the actuators 80, 85. Thus, the acceleration leads to a safe state, but the reachability controller 20 determines if other safe states 60 can be reached from that new higher speed state, specifically if the vehicle 65 can stop before striking the parked vehicle. What might normally be considered a safe state may not be a safe state due to outside conditions.

Figure 4:
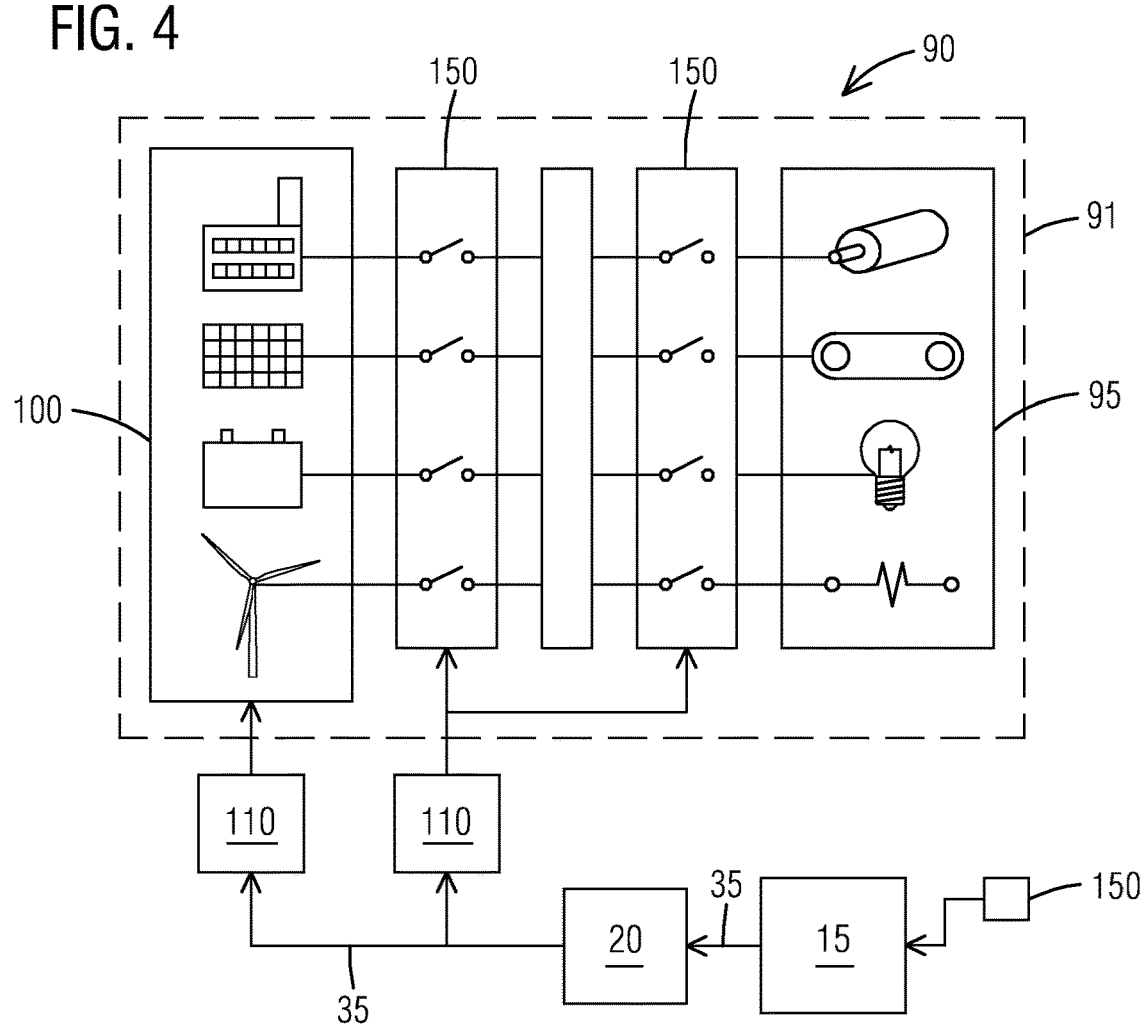
FIG. 4 is a schematic illustration of an autonomous power grid including a controller and a reachability controller.

FIG. 4 illustrates another example of an autonomous system 90 that includes a controller 15 and a reachability controller 20. In this example, the autonomous system 90 includes a physical device 11 in the form of a power grid 91 that operates to receive generated electrical power and distribute that power to a plurality of power consumers 95 or users. A plurality of distributed power generators 100 can include multiple different power sources that each operate to generate electrical power for delivery to the power grid 90 and distribution to the users 95. Each of the power generation units 100 is individually controllable to deliver a desired amount of power at a desired time. A plurality of switches 105 is provided to selectively connect or disconnect individual power generation units 100 and power consumers 95 as may be required. As is well known, other components such as energy storage units, transformers, and the like are also included in typical power grid systems 91 and further complicate the control of the power grid 91.

As with prior examples, the controller 15 includes a neural network model 30 of the power grid system 91 and its operating environment. However, the complexity of the neural network model 30 makes complete and thorough testing of all possible situations challenging if not impossible. The reachability controller 20 includes a simpler analytical model 40 of the power grid system 91 to allow the analytical model 40 to be more completely tested to assure that the reachability model 20 does not allow the system 91 to enter an unsafe state.

During operation of the power grid system 91, a user may provide inputs 150 such as system limitations, power generator outages, and the like. The controller 15 uses those inputs as well as inputs from various sensors to control the power generators 100 and the switches 105 to achieve the desired results. Each time the controller 15 determines that an adjustment to the system 91 is required, control signals 35 are generated and sent to the reachability controller 20. The control signals 35 are configured to control one or more actuators or system controls 110 as required. The reachability controller 20, receives or determines the current state of the system 91, analyzes the control signals 35, and determines a second state that would result if the control signals 35 were implemented. As discussed with previous examples, if the second state is a safe state, and the power grid system 91 could transition from the second state to other safe states, the control signals 35 are passed to the power grid system 91. However, if either of these questions are answered in the negative, the control signals 35 are not forwarded to the power grid system 91.

Figure 5:
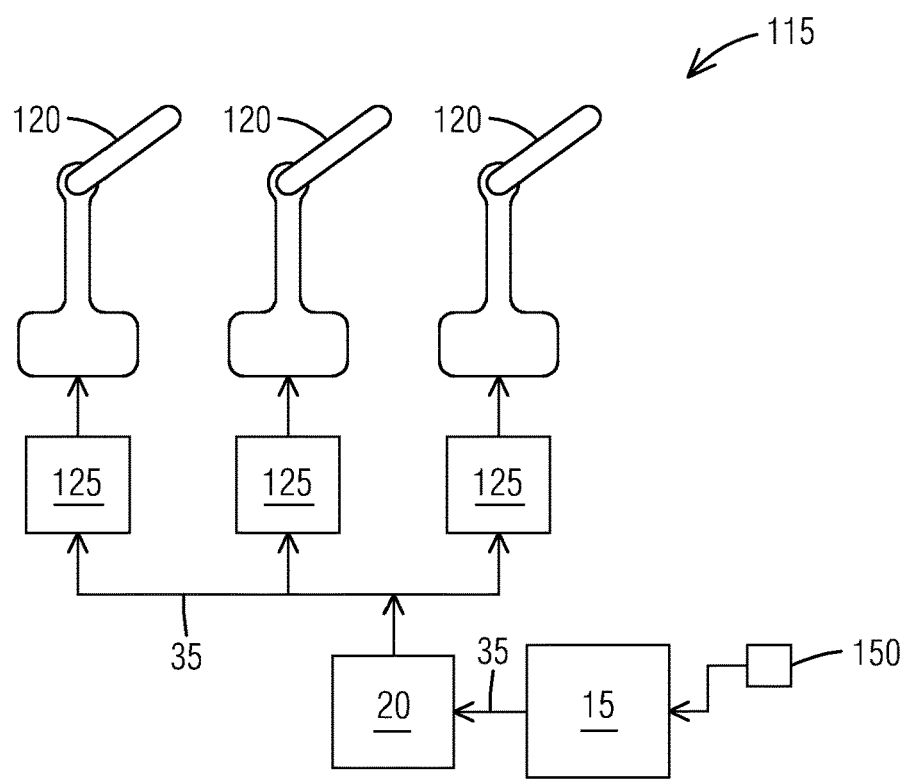
FIG. 5 is a schematic illustration of an autonomous robot system including a controller and a reachability controller.

FIG. 5 illustrates an example of an autonomous factory 115 that includes multiple robots 120 and could include other controllable components such as conveyors, machine tools, inventory control systems, and the like. It should be clear that while the following example discusses controlling a robot, the system could control virtually any device within the factory. Any device that includes motors or other controllable actuators as well as sensors that can sense the external environment and report the operation of the device within that environment can utilize the system described herein.

As with prior examples, each robot 120 or autonomous device includes an actuator 125 that may comprise multiple actuators or other control devices (e.g., motors, VFDs, etc.) that in turn control the movements or actions of the robot 120. A controller 15 includes a neural network model 30 of the controllable devices within the factory 115, or possibly the entire factory 115. One or more users may provide inputs 150 to the controller 15 that set parameters for the factory 115 such as production rates, production steps, and the like. The controller 15 uses those inputs and data provided by various sensors or other input devices to determine if the state of the factory 115 needs to change. The controller 15 generates control signals 35 that are first sent to a reachability controller 20 if a change of state is required. The reachability controller 20 analyzes the control signals 35 in view of the current state of the factory 115 to determine the likely second state of the factory 115 should the control signals 35 be implemented. If the reachability controller 20 determines that the second state is a safe state and that other safe states can be reached from the second state, the control signals 35 are passed to the robots 120 and other devices within the factory 115.

Figure 6:
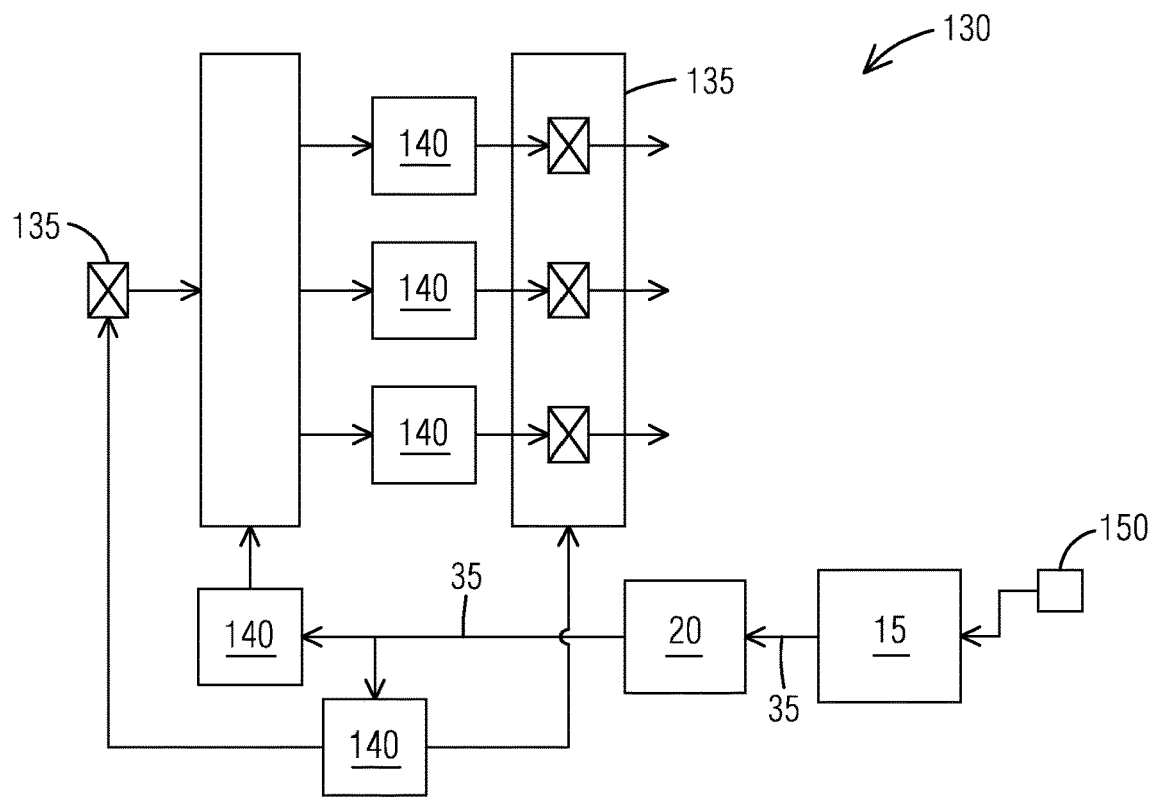
FIG. 6 is a schematic illustration of an autonomous manufacturing facility including a controller and a reachability controller.

FIG. 6 illustrates an example of an autonomous process plant 130 such as an oil refinery or chemical plant that includes multiple processes, valves, and other components 135 specific to the process being employed. As with prior examples, each process or device 135 includes an actuator 140 that may comprise multiple actuators or other control devices that in turn control the movements or actions of the process or device 135. A controller 15 includes a neural network model 30 of the controllable devices 135 within the process plant 130, or possibly the entire plant 130. One or more users may provide inputs 150 to the controller 15 that set parameters for the process plant such as production rates, production steps, and the like. The controller 15 uses those inputs and data provided by various sensors or other input devices to determine if the state of the process plant 130 needs to change. The controller 15 generates control signals 35 that are first sent to a reachability controller 20. The reachability controller 20 analyzes the control signals 35 in view of the current state of the process plant 130 to determine the likely second state of the process plant 130 should the control signals 35 be implemented. If the reachability controller 20 determines that the second state is a safe state and that other safe states can be reached from the second state, the control signals 35 are passed to the devices 135 within the process plant 130.

As discussed, the use of a reachability controller 20 is particularly advantageous for complex autonomous systems in which a controller 15 including a neural network model 30 cannot reasonably be tested for all possible scenarios. In these cases, a simple analytical model 40 can be completely tested and used in the reachability controller 20. The reachability analysis will likely provide fewer safe states than what the neural network model 30 would provide, but the more complete testing assures that the reachability controller 20 will not allow the system to transition to a state that is undesirable.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An autonomous system comprising:
   a vehicle operable to travel from a first point to a second point;
   a first actuator operable to adjust a speed of the vehicle;
   a second actuator operable to adjust a direction of travel of the vehicle;
   a controller operable to send control signals to the first actuator and the second actuator to facilitate the transition of the system from a first state to a second state during travel between the first point and the second point, wherein the controller employs a neural network model of the autonomous system to form the control signals; and
   a reachability controller coupled to the controller to receive the first state and the control signals and to analyze the first state and the control signals to determine if the second state is a safe state, wherein the analytical model includes a dynamical model of the autonomous system, the analytical model being simpler than the neural network model, whereby the analytical model allows calculation of states of the analytical model to determine if the states are safe or unsafe while allowing for a complete testing of all operating conditions.

2. The autonomous system of claim 1, wherein the first actuator includes a throttle controller and a brake controller.

3. The autonomous system of claim 1, wherein the analytical model includes a dynamical model of the autonomous system.

4. The autonomous system of claim 1, wherein the reachability controller analyzes the first state and the control signals to determine the second state and analyses the second state to determine if the vehicle can transition from the second state to a safe state.

5. The autonomous system of claim 4, wherein the reachability controller prevents the transition from the first state to the second state when the reachability controller determines that the autonomous system cannot reach a safe state from the second.

6. The autonomous system of claim 1, wherein the reachability controller prevents the transition from the first state to the second state when the reachability controller determines that the second state is not a safe state.

7. A method of operating an autonomous system, the method comprising:
   providing a vehicle operable to travel from a first point to a second point;
   positioning a first actuator in a first position, the first actuator controlling the speed of the vehicle;
   positioning a second actuator in a second position, the second actuator controlling a direction of travel of the vehicle, the first position and the second position defining a first state of the system;
   sending, by a first controller a control signal to one of the first actuator and the second actuator to change the state of the system, wherein the first controller includes a neural network model of the vehicle;
   analyzing, by a reachability controller, the first state and the control signal to determine a second state which would result when the control signals are implemented, wherein the reachability controller includes an analytical model of the vehicle, the analytical model being simpler than the neural network model, whereby the analytical model allows calculation of states of the analytical model to determine if the states are safe or unsafe while allowing for a complete testing of all operating conditions;
   blocking the control signals in response to the analysis showing that the second state is not a safe state; and
   blocking the control signals in response to the analysis showing that a safe state cannot be reached from the second state.

8. The method of claim 7, wherein the vehicle is an over-the-road vehicle and the first actuator includes a throttle actuator and a brake actuator.

9. The method of claim 7, wherein the vehicle is an aerial vehicle and the first actuator and the second actuator cooperate to control the direction of travel and speed of the vehicle.

10. The method of claim 7, further comprising transitioning to a safe state in response to a determination that either the second state is not a safe state or that a safe state cannot be reached from the second state.

11. The method of claim 7, further comprising passing the control signals to the first actuator and the second actuator to transition the vehicle to the second state in response to a determination that the second state is a safe state and that a safe state can be reached from the second state.

* * * * *